United States Patent [19]

Matsukura et al.

[11] Patent Number: 5,035,955
[45] Date of Patent: Jul. 30, 1991

[54] HEAT-SHRINKABLE LAMINATED FILM

[75] Inventors: Yoshihiro Matsukura, Niihari; Nobuyuki Hisazumi; Kunio Shibuya, both of Tsuchiura, Japan

[73] Assignee: Kureha Kagaku Kogyo Kabushiki Kaisha, Tokyo, Japan

[21] Appl. No.: 299,012

[22] Filed: Dec. 6, 1988

[30] Foreign Application Priority Data

Dec. 29, 1987 [JP] Japan ................. 62-333978
Dec. 29, 1987 [JP] Japan ................. 62-333979
Nov. 2, 1988 [JP] Japan ................. 63-278129

[51] Int. Cl.$^5$ ............................................. B32B 27/00
[52] U.S. Cl. ..................................... 428/520; 428/518; 428/349; 428/910; 428/34.9; 428/36.7
[58] Field of Search ............ 428/910, 34.9, 520, 428/349, 518, 36.7

[56] References Cited

U.S. PATENT DOCUMENTS

| | | | |
|---|---|---|---|
| 3,852,177 | 0/1974 | Atchison et al. | 204/159 |
| 4,714,638 | 12/1987 | Lustig et al. | 428/520 |
| 4,892,765 | 1/1990 | Hisazumi et al. | 428/34.9 |
| 4,894,107 | 1/1990 | Tse et al. | 156/322 |
| 4,957,790 | 9/1990 | Warren | 428/34.9 |

FOREIGN PATENT DOCUMENTS 0107854 5/1984 European Pat. Off. .
0202814 11/1986 European Pat. Off. .
0204918 12/1986 European Pat. Off. .

*Primary Examiner*—Edith L. Buffalow
*Attorney, Agent, or Firm*—Nixon & Vanderhye

[57] ABSTRACT

The present invention discloses a biaxially oriented heat-shrinkable laminated film comprising a laminate having a vinylidene chloride copolymer composition layer containing 0.5 to 9.1% by weight of a polyfunctional (metha)crylate, the vinylidene chloride copolymer being crosslinked by applying electron beams to the laminate at a dosage rate of 1 to 10 megarads, and exhibiting a heat shrinkage percentage at 90° C. of 15% or more and excellent gas barrier properties.

The laminated film of the present invention also exhibits excellent gas barrier properties, transparency, melt hole resistance and heat sealing resistance. The film having an outer layer composed a crosslinked polyolefin exhibits particularly excellent melt hole resistance and heat sealing resistance.

12 Claims, No Drawings

HEAT-SHRINKABLE LAMINATED FILM

BACKGROUND OF THE INVENTION

The present invention relates to a biaxially oriented heat-shrinkable laminated film which has good heat shrinkability, excellent melt hole resistance and heat sealing resistance (the heat resistance of a sealed portion), which remains transparent after being shrunk and serves as a packaging material suitable for packaging foods, which exhibits a shrinkage percentage of 15% or more at 90° C. and excellent gas barrier properties, and which comprises a laminate having a layer composed of a vinylidene chloride copolymer composition containing 0.5 to 9.1 % by weight of polyfunctional (metha)-crylate, in which the vinylidene chloride copolymer is crosslinked by applying electron beams at a dosage of 1 to 10 megarads. The present invention also relates to a method of producing such a heat-shrinkable laminated film.

Shrink packaging is generally the most convenient form of packaging for food products such as fatty foods like raw meat, processed meat, cheese and the like, all of which are irregular in form. Since such foods are required to be stored for a long period, the packaging of such foods must have such characteristics as excellent gas barrier properties (below 200 cc/m$^2$.day.atm at 30° C. and 100% RH), excellent heat sealing properties, cold resistance, melt hole resistance, heat sealing resistance (the heat resistance of a sealed portion) and the like, as well as having transparency after being shrunk which is one important factor that affects the appearance of products. The packaging and sterilization of fatty foods often involves problems in that a film softened by oil and heat may be stretched to become thin and thus break (melt hole) and in that a sealed part or parts in the vicinity thereof may be broken owing to heat shrinkage stress during sterilization. The industry has therefore required for heat-shrinkable films having gas barrier properties, melt hole resistance, heat sealing resistance and excellent transparency after being shrunk.

Simple films of vinylidene chloride copolymer (referred to as PVDC hereinafter) not only have shrinkability but also display excellent characteristics with respect to gas barrier properties, oil resistance, ligating properties and the like, and these films are thus widely used.

However, since ordinary simple PVDC films contain 6 to 10% by weight of such additives as plasticizers and stabilizers and so on which are added for the purpose of providing these films with cold resistance, flexibility for improving their ligating properties and good film-forming properties, certain problems occur because the additives migrate to foods and are thus sanitarily undesirable according to the kind of foods packaged, and also because the strength, particularly the cold resistance, of the films may in some cases be insufficient under severe conditions such as the packaging of heavy foods. There is therefore a demand for excellent packaging materials having none of these problems.

In order to remove such problems, a proposal has been made (see Canadian Patent Application No. 982923) regarding a three-layer film formed by co-extrusion and comprising an intermediate PVDC layer containing very small amounts of additives such as plasticizers and stabilizers, or substantially no additives, and two outer layers of ethylene-vinyl acetate copolymer (EVA) which have excellent low-temperature resistance and good adhesion to the PVDC layer, these outer layers being provided on both sides of the PVDC layer. This three-layer film involves no hygienic problems as with the simple PVDC film and also display an improved cold resistance.

The films described below have also been proposed.

A flexible laminate was disclosed in Japanese Patent Publication No. 43024/1983 (U.S. Pat. No. 3,741,253) which has (1) a first layer containing an organic polymer; (2) a PVDC-based gas barrier layer with oxygen permeability that is sufficiently low to ensure that the oxygen permeation coefficient thereof is below 70 cc/m$^2$/24 hours/atm (measured at 22.8° C. and relative humidity 0% in accordance with ASTM Standard D 1434); and (3) a layer containing an organic polymer having resistance to cruel use, and which is suitable for use in heat-shrinkage packaging, the laminate being characterized in that the first layer (1) is composed of an oriented copolymer of ethylene and vinyl acetate containing 5 to 20% by weight of the unit derived from vinyl acetate, the copolymer being crosslinked by irradiation, in that the gas barrier layer (2) contains 70 to 85% by weight of the unit derived from vinylidene chloride and 30 to 15% by weight of the unit derived from vinyl chloride, and in that the layer (3) contains (i) a copolymer of ethylene and vinyl acetate having 5 to 20% by weight of the unit derived from vinyl acetate, or (ii) a blend of isotactic polypropylene, atactic polypropylene and polybutene-1.

A heat resistant laminate was disclosed in Japanese Patent Laid-Open No. 11342/1985 (U.S. Pat. No. 4,699,846) which has three or more layers comprising a resin layer having gas barrier properties, a layer of thermoplastic resin that differs from the gas barrier resin and an adhesive layer interposed therebetween, the laminate being characterized in that the adhesive layer is composed of 100 parts by weight of adhesive resin which can be melt-extruded and 0.1 to 50 parts by weight of radiation sensitive compound and is crosslinked by radiation.

An oriented film laminate was disclosed in Japanese Patent Publication No. 47859/1986 (U.S. Pat. No. 4,044,187 which is formed by irradiating the whole of a film laminate composing a film layer (1) which serves as a base layer and contains an α-monoolefin polymer crosslinked by irradiation, and a film layer (2) containing a polymer crosslinkable by irradiation so that the polymer in the film layer (2) is crosslinked and the polymer in the film layer (1) is further crosslinked.

A heat-shrinkable biaxially oriented multi-layer film is disclosed in Japanese Patent Laid-Open No. 3948/1987 which contains a gas barrier layer composed of a vinylidene chloride-methyl acrylate copolymer, which is irradiated at a dosage of about 1 to 5 megarads and which is suitable for packaging primal and subprimal slices of meat and processed meat.

A molecule oriented multi-layer polymer film is disclosed in Japanese Patent Laid-Open No. 23752/1987 which comprises first and second layers each composed of ethylene-vinyl acetate copolymer as a principal component and a third layer disposed between the first and second layers and composed of PVDC, each of the first, second and third layers being crosslinked by irradiation at a dosage equal to that of electron beams of 1.5 megarads or more.

In addition, laminated films having as an outer layer a polyolefin layer or EVA layer crosslinked by irradiation have been proposed in Japanese Patent Laid-Open No. 3456/1972, Japanese Patent Publication No. 20549/1979, U.S. Pat. Nos. 4,044,187, 4,064,296, 4,352,844 and 4,501,780, Japanese Patent Publication Nos. 5553/1968, 20599/1971, 44019/1976 and 44020/1976, British Patent No. 2,040,804, U.S. Pat. Nos. 4,391,862, 4,448,792, 4,514,465 and 4,551,380, etc.

However, although conventional laminated films such as EVA/PVDC/EVA films are laminated films which can be heat-sealed and exhibit good cold resistance and excellent gas barrier properties and which compensate for the deficiency of simple PVDC films, they lack melt hole resistance and heat sealing resistance. Furthermore, since a laminate composed of a PVDC layer and two polyolefin layers provided on both sides thereof is generally oriented at a temperature up to 40° C. below the melting point of the polyolefin crystal in order to provide the laminate with heat shrinkability, the effect of stretch orientation cannot be sufficiently imparted to the PVDC layer. The PVDC layer thus exhibits a poor heat shrinkage percentage and, when the laminate is heat-shrunk, the PVDC layer has the tendency to bend limply because the behavior of the shrinkage is slower than those of the other layers and this consequently obstructs the laminate's transparency after shrinkage.

For this reason, there is a strong demand in the field of food packaging for a heat-shrinkable film that not only display good gas barrier properties and cold resistance, excellent melt hole resistance and heat sealing resistance, but also exhibits excellent transparency after being shrunk.

As a result of the energetic research performed by the inventors with a view to solving the above-described problems of the prior art, the inventors found that heat shrinkability can be given to a PVDC layer by adding a crosslinking agent to the PVDC intermediate layer and then crosslinking it by irradiation with electron beams at a low dosage and by the following stretching process. This invention could be attained based on this finding.

SUMMARY OF THE INVENTION

It is an object of the present invention to provide a biaxially oriented heat-shrinkable laminated film which comprises a laminate having a layer of PVDC composition containing 0.5 to 9.1% by weight of polyfunctional (metha)crylate, the PVDC being crosslinked by applying electron beams to the laminate at a dosage of 1 to 10 megarads, and which exhibits a shrinkage percentage of 15% or more at 90° C. and excellent gas barrier properties.

In this invention, (metha)crylate denotes acrylate or methacrylate.

It is another object of the present invention to provide a heat-shrinkable laminated film which has another layer comprising a layer of polyolefin polymer composition containing 0.5 to 7.5% by weight of at least one crosslinking agent selected from the group consisting of $\alpha, \omega$-alkyl di(metha)crylates and aromatic urethane (metha)crylates, the PVDC and the polyolefin being crosslinked by applying electron beams to the laminate at a dosage of 1 to 10 megarads.

It is still another object of the present invention to provide a heat-shrinkable laminated film which comprises a laminate comprising outer and inner layers composed of a polyolefin, an intermediate layer composed of PVDC composition containing 0.5 to 9.1% by weight of polyfunctional (metha)crylate, and adhesive layers each composed of an adhesive polymer and respectively disposed between the above-described layers, the PVDC being crosslinked by applying electron beams to the laminate at a dosage of 1 to 10 megarads.

It is a further object of the present invention to provide a heat-shrinkable laminated film in which the outer layer of the above-described laminate is composed of a polyolefin composition containing a crosslinking agent, and the PVDC and the polyolefin are crosslinked by applying electron beams to the laminate at a dosage of 1 to 10 megarads.

It is a still further object of the present invention to provide a heat-shrinkable laminated film which is configured as described above so as to exhibit a heat shrinkage percentage of 15% or more at 90° C. and excellent gas barrier properties, melt hole resistance, heat sealing resistance and transparency, as well as being well balanced.

It is a still further object of the present invention to provide a method of producing a heat-shrinkable laminated film exhibiting a heat shrinkage percentage of 15% or more at 90° C. and excellent gas barrier properties, the method being characterized by comprising the steps of producing a melt tubular film composed of a laminate having a layer of PVDC composition containing 0.5 to 9.1% by weight of polyfunctional (metha)crylate by a melt extrusion method, quenching the melt tubular film so that the degree of crystallization of PVDC is 5% by weight or less, applying electron beams to the thus quenched tubular film at a dosage of 1 to 10 megarads, and biaxially stretching the resultant tubular film by an inflation method.

DETAILED DESCRIPTION OF THE INVENTION

Examples of polyolefins that may be used in the outer or inner layer in the present invention include high-density polyethylene (HDPE), medium-density polyethylene (MDPE), low-density polyethylene (LDPE), polypropylene (PP) ethylene-vinyl acetate copolymers (EVA) containing 5 to 20% by weight of vinyl acetate, ethylene-ethyl acrylate copolymers (EEA) containing 5 to 20% by weight of ethyl acrylate, ethylene-propylene copolymers (Et-PP) containing 2 to 7% by weight of ethylene, ethylene-methacrylic acid copolymers (EMAAc) containing 5 to 20% by weight of methacrylic acid, ethylene-acrylic acid copolymers (EAAc) containing 5 to 20% by weight of acrylic acid, linear low-density polyethylene, i e., ethylene-($C_4$ to $C_{12}$) $\alpha$-olefin copolymers (LLDPE), very low-density polyethylene (VLDPE) such as Excellene VL 200 having a density ($\rho$) of 0.9 and a melt index (MI) of 2 and produced by Sumitomo Chemical Industry Co., Ltd., and ionomers. Among these polymers, LDPE, EVA, EEA, Et-PP, EMAAc, LLDPE, VLDPE and mixtures of two or more of these polymers are particularly preferable.

The PVDC is preferably a copolymer composed of vinylidene chloride as a main component and a monomer which is copolymerizable with the vinylidene chloride and contains 65 to 95% by weight of the vinylidene chloride component. If the content of vinylidene chloride is less than 65%, the PVDC shows a rubber state at room temperature and has no crystallizability and its gas barrier properties will be significantly impaired, thus lacking practicability. If the content is over 95% by weight, the PVDC has a greatly high melting point, will be easily decomposed by heat, and cannot be easily subjected to stable melt extrusion. Examples of monomers that are copolymerizable with vinylidene chloride include vinyl chloride, acrylonitrile, acrylic acid, methacrylic acid, alkyl acrylates having alkyl groups of $C_1$ to $C_{18}$, alkyl methacrylates having alkyl groups of $C_1$ to $C_{18}$, maleic anhydride, maleic acid, alkyl maleates, itaconic acid, alkyl itaconates, vinyl acetate, ethylene, propylene, isobutylene, butadiene. At least one monomer of the above-described unsaturated monomers should be selected.

The plasticizers that may be used in the present invention are not particularly limited, and general low-molecular plasticizers and high-molecular plasticizers may be used. Known stabilizers may also be used according to demands.

Examples of plasticizers that may be used include aliphatic dibasic acid esters such as dioctyl adipate, dioctyl sebacate and dibutyl sebacate; esters of hydroxy polycarboxylic acids such as tributyl citrate and acetyl tributyl citrate; glycerin esters; polyester plasticizers and epoxidized vegetable oil; epoxidized octyl stearate; and isopropylidenediphenol-epichlorohydrin condensate. Such plasticizers may be used to improve the extrusion properties of the film.

The amount of plasticizer added is preferably 0.1 to 3 parts by weight relative to 100 parts by weight of PVDC. If the amount of plasticizer added is less than 0.1 parts by weight, there will be no significant effect, while if the amount of plasticizer added is over 3 parts by weight, the gas barrier properties will deteriorate, resulting in a failure to achieve the objects of the present invention.

Any of the heat stabilizers available on the market may be used as stabilizers in the present invention, but epoxy stabilizers are particularly preferable. Each of such epoxy stabilizers has an epoxy group having a three-member ring of carbon-carbon-oxygen in its molecule, serves as an agent for capturing hydrogen chloride generated by the thermal decomposition of PVDC and is added for the purpose of preventing any deterioration of PVDC. Examples of epoxy stabilizers include epoxidized vegetable oil such as soybean oil, safflower oil, sunflower oil, linseed oil and cotton-seed oil; epoxidized fatty acid monoesters represented by epoxidized octyl stearate; epoxidized fatty acid diesters obtained by epoxidizing glycol esters of unsaturated fatty acids; and alicyclic epoxides represented by epoxyhexahydrophthalate.

The compound used as the crosslinking agent of the present invention should be one which, when two or more carbon double bonds of the compound are excited by irradiation with electron beams, produces radicals which combine with the radicals produced from the polyolefin polymer or the PVDC irradiated with electron beams to form crosslinking points. The presence of such crosslinking points enables a network structure to be easily formed in the polyolefin polymer or the PVDC irradiated with electron beams.

In order to provide the PVDC with a crosslinked structure, at least one polyfunctional (metha)crylate is added as a crosslinking agent to the PVDC which is then subjected to melt co-extrusion under kneading by a known method to form a laminate, followed by irradiation with electron beams to obtain a laminate having a PVDC layer with a crosslinked structure.

The term "crosslinked" used in the present invention means that a gel fraction used as a measure of crosslinkage is 20% or more, as described below.

Examples of compounds that may be preferably used as the polyfunctional (metha)crylate serving as the cross-linking agent for obtaining the PVDC having a crosslinked structure include compounds represented by the following formula:

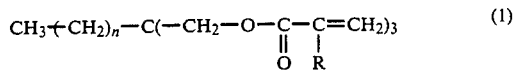

(wherein R denotes hydrogen or methyl group and the number n of methylene carbon atoms of trimethylolalkane tri(metha) crylate denotes an integer of 0 to 4, preferably 0 to 2) and compounds represented by the following formula:

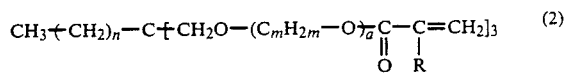

(wherein R denotes hydrogen or methyl group; the number n of methylene carbon atoms of trimethylolalkane alkoxide (methal)crylate denotes an integer of 0 to 4, preferably 0 to 2; m denotes an integer of 1 to 3 and a denotes an integer of 1 to 3).

If the number n of methylene carbon atoms of a polyfunctional (metha)crylate represented by the formula (1) is 5 or more, the compound becomes undesirable because of its poor compatibility with the vinylidene chloride copolymer and its low level of gel fraction which is a measure of crosslinkage.

Examples of polyfunctional (metha)crylates represented by the formula (1) include trimethylolpropane trimethacrylate (TMPTMA), trimethylolpropane triacrylate and trimethylolpentane trimethacrylate.

If the number n of methylene carbon atoms of a polyfunctional (metha)crylate represented by the formula (2) is 5 or more, the compound becomes undesirable because of its poor compatibility with the vinylidene chloride copolymer and its low level of gel fraction. A number m of alkoxide carbon atoms of 4 or more is undesirable because gel fraction is small. A number of alkoxide groups of 4 or more is also undesirable because gel fraction is small.

Examples of polyfunctional (metha)crylates represented by the formula (2) include trimethylolpropane propoxidetrimethacrylate (TMPPOTMA), trimethylolpropane propoxidetriacrylate, trimethylolpropane dipropoxide-trimethacrylate (TMP 2POTMA), trimethylolpropane tripropoxidetrimethacrylate (TMP 3POTMA), trimethylolpentane propoxidetrimethacrylate, trimethylolpropane ethoxidetrimetnacrylate, and trimethylolpropane butoxidetrimethacrylate.

Each of such polyfunctional (metha)crylates is added in an amount of 0.5 to 9.1% by weight, preferably 2 to 6% by weight, of PVDC. An amount of the (metha)crylate added of less than 0.5% by weight is undesirable because the gel fraction becomes small, and an amount of the (metha)crylate added of over 9.1% by weight produces deterioration in extrusion properties, for example, causes variation in the amount of resin discharged during extrusion.

The gel fraction is preferably within the range of 20 to 80%, more preferably 30 to 80%. If the gel fraction is less than 20%, the effect of improving the melt hole resistance cannot be sufficiently obtained. In order to prevent any thermal polynerization during extrucion, about 500 ppm of a polymerization inhibitor such as hydroquinone monomethyl ether (HQME) may be added on demand.

Examples of adhesive polymers that may be used in the adhesive layers of the present invention include derivatives of α-olefin polymers such as polymers obtained by graft polymerization polyethylene or polypropylene with unsaturated carboxylic acids or anhydrides thereof and salts thereof; α-olefin-vinyl acetate copolymers and derivatives thereof; α-olefin-unsaturated carboxylic acid copolymers and derivatives thereof such as ethylene-(metha) crylic acid copolymers, ethylene-alkyl (metha)crylate copolymers, polymers obtained by graft polymerization these copolymers with unsaturated carboxylic acids or anhydrides thereof, and salts thereof. Examples of unsaturated carboxylic acids or anhydrides that may be used in graft polymerization include acrylic acid, methacrylic acid, maleic acid and maleic anhydride. The amount of the unsaturated carboxylic acid or anhydride added is preferably 0.01 to 5% by weight of the polymer using as a base. An ethylene-ethyl acrylate copolymer (EEA) containing 5 to 25% by weight of ethyl acrylate is particularly preferable as an adhesive polymer.

When a crosslinked structure is formed in the polyolefin of the outer layer, at least one compound selected from the group consisting of α,ω-alkyl di(metha)crylates and aromatic urethane (metha)crylates is added as the crosslinking agent to the polyolefin which is then subjected to melt extrusion under kneading by a known method to form a laminate, followed by irradiation with electron beams to form the polyolefin having a crosslinked structure.

Examples of α, ω-alkyl di(metha)crylates serving as the crosslinking agent used for obtaining the polyolefin having a crosslinked structure is compounds represented by the following formula:

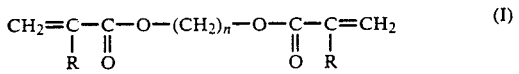

(wherein R denotes hydrogen or methyl group and n denotes an integer of 10 to 36, preferably 14 to 36). If the number of the alkyl carbon atoms is 9 or less, the compounds become undesirable because their compatibility with the polyolefin is poor and the crosslinking agents significantly separate out immediately after melt extrusion. While if the number of alkyl carbon atoms is 37 or more, the crosslinking agents become undesirable because they easily solidify at room temperature and thus the previous mixing with the polyolefin cannot be easily performed. Examples of α, ω-alkyl di-(metha)crylates represented by the formula (I) include α, ω-n-decanyl diacrylate, α, ω-n-octadecanyl diacrylate, α, ω-n-octacosanyl dimethacrylate and α, ω-n-hexatriacosanyl diacrylate.

Examples of aromatic urethane (metha)crylates serving as the crosslinking agents used for obtaining the polyolefin having a crosslinked structure in the present invention include compounds represented by the following formula:

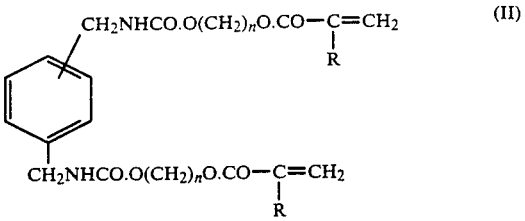

(wherein R denotes hydrogen or methyl group, n denotes an integer of 1 to 6 and the urethane (metha)crylates combine with the aromatic ring at the metha- or para-position) and compounds represented by the following formula:

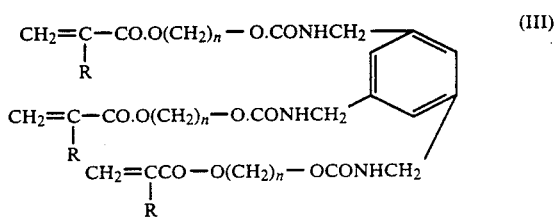

(wherein R denotes hydrogen or methyl group and the number of methylene carbon atoms n of each urethane (metha)crylate denotes an integer of 1 to 6).

If the number of methylene carbon atoms n of each urethane (metha)crylate of the formula (II) is 7 or more, such agents become undesirable because their compatibility with the polyolefin is poor and the agents significantly separate out immediately after melt extrusion.

Examples of aromatic urethane (metha)crylates represented by the formula (II) include 2-propenoic acid 1,3-phenylenebis(methyleneiminocarbonyloxy-2,1-ethanediyl) ester; 2-propenoic acid 1,4-phenylenebis(methyleneiminocarbonyloxy-2,1-ethanediyl) ester, 2-propenoic acid 1,3-phenylenebis(methyleneiminocarbonyloxy-methanediyl) ester, 2-propenoic acid 1,3-phenylenebis(methyleneiminocarbonyloxy-6,1-hexanediyl) ester, 2-isopropenoic acid 1,3-phenylenebis(methyleneiminocarbonyloxy-2,1-ethanediyl) ester and 2-isopropenoic acid 1,4-phenylenebis(methyleneiminocarbonyloxy-2,1-ethanediyl)ester.

If the number n of methylene carbon atoms of each urethane (metha)crylate shown in the formula (III) is 7 or more, the compounds become undesirable because their compatibility with the polyolefin is poor and the crosslinking agents significantly separate out immediately after melt extrusion.

Examples of aromatic urethane (metha)crylates represented by the formula (III) include 2-propenoic acid 1,3,5-phenylenetris(methyleneiminocarbonyloxy-2,1-ethanediyl) ester, 2-isopropenoic acid 1,3,5-phenylenetris(methyleneiminocarbonyloxy-2,1-ethanediyl) ester, 2-propenoic acid 1,3,5-phenylenetris(methyleneiminocarbonyloxy -6,1-hexanediyl) ester and 2-propenoic acid 1,3,5-phenylenetris(methyleneiminocarbonyloxy methanediyl) ester.

Among these compounds, α, ω-n-octadecanyl diacrylate, 2-propenoic acid 1,3-phenylenebis(methyleneiminocarbonyloxy-2,1-ethanediyl) ester and 2-propenoic acid 1,3,5-phenylenetris(methyleneiminocarbonyloxy-2,1-ethanediyl) ester are particularly preferable as the crosslinking agent.

When such crosslinking agents are used, they are preferably added to the polyolefin in amounts of 0.5 to 7.5% by weight of the polyolefin. An amount of the agent added of over 7.5% by weight is undesirable because of deterioration in extrusion properties, for example, the occurrence of variation in the amount of resin discharged during extrusion.

The addition of the crosslinking agent in an amount of 0.5% by weight or more of the polyolefin produces crosslinkage in the polyolefin after irradiation and makes the gel fraction increase. As a result, the melt hole resistance and heat sealing resistance of the laminate produced can be improved.

The gel fraction of the polyolefin is preferably 20 to 80%, particularly 30 to 80%.

In order to prevent any thermal polymerization during extrusion, about 500 ppm of a polymerization inhibitor such as hydroquinone monomethyl ether may be added on demands.

The heat-shrinkable laminated film of the present invention comprises a laminate having a layer of PVDC composition containing 0.5 to 9.1% by weight of polyfunctional (metha)crylate, and the number of laminate is not particularly limited. The other layers than the PVDC layer involve the adhesive layers as well as the layer composed of thermoplastic resin. A polyolefin is preferable as the thermoplastic resin.

Preferable examples of forms of the laminate include a form (i) comprising outer and inner layers each composed of a polyolefin, an intermediate layer composed of PVDC composition containing a polyfunctional (metha)crylate and adhesive layers disposed between the respective layers; a form (ii) in which the outer layer in form (i) is composed of a polyolefin composition containing 0.5 to 7.5% by weight of at least one crosslinking agent selected from the group consisting of α, ω-alkyl di(metha)crylates and aromatic urethane (metha)crylates; and a form (iii) comprising a PVDC composition layer containing a polyfunctional (metha)crylate and a polyolefin composition layer containing the above-described crosslinking agent.

In each of the laminates, the PVDC composition containing the polyfunctional (metha)crylate and the polyolefin composition containing the crosslinking agent are crosslinked by irradiation with electron beams at a dosage of 1 to 10 megarads preferably 2-6 megarads so that the biaxially oriented heat-shrinkable laminated film exhibiting a heat shrinkage percentage of 15% or more at 90° C. and excellent gas barrier properties can be obtained.

Bags formed by films which exhibit a heat shrinkage percentage of less than 15% at 90° C. are undesirable for packaging foods such as fatty foods like raw meat, processed meat, cheese and the like, which are all irregular in shape, because the films lack the clinging to such foods and produce the separation of meat juice which reduces the values of products.

The oxygen gas permeability of the laminate must be 200 cc/m$^2$·day·atm or less, preferably 100 cc/m$^2$·day·atm or less. Gas permeability of over 200 cc/m$^2$·day·atm is undesirable because the life of the foods packaged becomes short.

A method of producing a laminate comprising the polyolefin outer and inner layers and the PVDC intermediate layer is described below as an example of the process of producing the laminate of the present invention. Other laminates comprising two or more layers containing the PVDC layer can be produced by the similar process as that described below.

A polyolefin composition which forms the outer layer and contains as appropriate amount of a crosslinking agent or no crosslinking agent, PVDC composition which forms the intermediate layer and contains a polyfunctional (metha)crylate, a polyolefin which forms the inner layer and an adhesive polymer which forms the adhesive layers are respectively melt-kneaded in extruders. These materials are then introduced into a laminating ring die and laminated in the order of the outer layer/the adhesive layer/the intermediate layer/the adhesive layer/the inner layer, by co-extrusion. The melt tubular film obtained is then quenched by a cooling water shower ring at 10 to 20° C. to form a flat tubular film which exhibits a degree of crystallinity of PVDC that is restricted to 5% by weight or less, preferably 3% by weight or less. It is undesirable to perform the irradiation with electron beams in a state wherein the degree of crystallinity is over 5% by weight because the laminate film causes coloring (yellowing) owing to coloring of PVDC. The flat tubular film obtained is then introduced into an electron beam irradiating apparatus in which whole of the laminate is irradiated with electron beams at a dosage of 1 to 10 megarads, preferably 2 to 6 megarads. Afterward, the tubular film is simultaneously biaxially oriented at 60 to 120° C. by an inflation method.

Electron beams which have 150 to 10,000 KeV of energy and which are emitted from electron beam accelerators of various types such as the Cockcroft-Walton type, the Van de Graaff type, resonance transformer type, insulated core transformer type, linear accelerator type, dynamitron type and high-frequency cyclotron type can be used in the present invention.

Effect of the Invention

Since the PVDC layer itself in the heat-shrinkable laminated film of the present invention exhibits a heat shrinkage percentage L/T of 15% or more at 90° C. which is near the heat shrinkage percentage of the outer and inner layers, the PVDC layer does not bend limply even after the laminated film has been subjected to heat shrinkage. The laminated film therefore exhibits excellent transparency and a better heat shrinkage percentage.

When the outer layer is composed of the crosslinked polyolefin, the laminated film exhibits particularly excellent melt hole resistance and heat sealing resistance.

When the adhesive layers provided in contact with the sides of the PVDC layer are composed of EEA, since the EEA is crosslinked by irradiation with electron beams at a dosage of 6 to 10 megarads, the heat resistance of the adhesive layers can be improved and any delamination can be prevented during boiling.

Although the present invention is described in detail below with reference to examples, the present invention is not limited to these examples.

Symbols shown in examples and comparative examples of the heat shrinkable laminated film of the present invention represent the following compositions:

| Symbol | Composition |
| --- | --- |
| A-X | PVDC |

-continued

| Symbol | | Composition |
|---|---|---|
| | Vinylidene chloride/vinyl chloride = 87/13% by weight | 100 parts by weight |
| | Dibutyl sebacate | 1 part by weight |
| | Epoxidized soybean oil | 2 parts by weight |
| | TMPTMA | X parts by weight (4.8% by weight at X = 5, 2.0% by weight at X = 2) |
| B-X | PVDC | |
| | Vinylidene chloride/vinyl chloride = 87/13% by weight | 100 parts by weight |
| | Dibutyl sebacate | 1 part by weight |
| | Epoxidized soybean oil | 2 parts by weight |
| | TMPPOTMA | X parts by weight (4.8% by weight at X = 5, 2.0% by weight at X = 2) |
| C-X | Linear low-density polyethylene | 100 parts by weight |
| | Melt index: 2.1 | |
| | Density: 0.92 g/cc | |
| | α,ω-n-octadecanyl diacrylate | X parts by weight (2.9% by weight at X = 3, 3.8% by weight at X = 4) |
| D-X | Linear low-density polyethylene | 100 parts by weight |
| | Melt index: 2.1 | |
| | Density: 0.92 g/cc | |
| | 2-Propenoic acid 1,3-phenylenebis(methyleneiminocarbonyloxy-2,1-ethanediyl) ester | X parts by weight (2.9% by weight at X = 3) |
| E-X | Linear low-density polyethylene | 80 parts by weight |
| | Melt index: 2.1 | |
| | Density: 0.92 g/cc | |
| | Ethylene-vinyl acetate copolymer (EVA) | 20 parts by weight |
| | Melt index: 2.0 | |
| | Content of vinyl acetate: 5% by weight | |
| | Density: 0.92 g/cc | |
| | 2-Propenoic acid 1,3-phenylenebis(methyleneiminocarbonyloxy-2,1-ethanediyl) ester | X parts by weight (2.9% by weight at X = 3) |
| F | Ethylene-ethyl acrylate copolyer | |
| | Content of ethyl acrylate: | 15% by weight |
| | Melt index: 1.5 | |
| | Density: 0.93 g/cc | |

EXAMPLE 1

A PVDC composition (A-5), a linear low-density polyethylene composition (C-3), a linear low-density polyethylene (C-0) and an ethylene-ethyl acrylate copolymer (F) were separately extruded through four extruders, and the melted polymers were introduced into a co-extrusion ring die in which layers were subjected to melt bonding in the order of (C-3)/(F)/(A-5)/(F)/(C-0) from an outer layer to an inner layer and then co-extruded as five layers. The resin temperature of the melt tubular film was 200° C. at the outlet of the die. The melt tubular film was quenched by a cooling water shower ring at 10 to 20° C. to form a flat tubular film having a width of 150 mm and a thickness of 470 μm. From the thus-formed flat tubular film was separated the core layer (PVDC layer). The degree of crystallinity of the PVDC layer which was measured by gradient tube density determination method was 3% by weight.

The flat tubular film was then irradiated at a dosage of 2 megarads in an electron beam irradiating apparatus at an accelerating voltage of 500 KeV. The flat tubular film was then passed through a hot-water bath at 90 to 95° C. and a hot-air cylinder at 110° C. and each 3 times stretched in the longitudinal and lateral directions by an inflation method while cooling by an air ring at 20° C.

The biaxially oriented film obtained had a width of about 450 mm and a thickness of about 52 μm.

EXAMPLE 2

A biaxially oriented film was produced by the same method as that employed in Example 1 with the exception that linear low-density polyethylenes (D-0) and (D-3) were respectively used in place of the inner layer (C-0) and the outer layer (C-3) of Example 1.

EXAMPLE 3

A PVDC composition (A-5), a linear low-density polyethylene-EVA mixture composition (E-3), a linear low-density polyethylene-EVA mixture (E-0) and an ethylene-ethyl acrylate copolymer (F) were laminated in the order of (E-3)/ (F)/(A-5)/(F)/(E-0) from an outer layer to an inner layer. A biaxially oriented film was produced from the obtained laminate in the same way as that employed in Example 1.

EXAMPLE 4

A biaxially oriented film was produced in the same way as that employed in Example 1 with the exception that (C-0) and (A-2) were respectively used in place of the outer layer (C-3) and the core layer (A-5) of Example 1, the layers were laminated in the order of (C-0)/(F)/(A-2)/(F)/(C-0) from the outer layer to the inner layer, and the dosage of irradiation was set to 6 megarads by controlling electron beams.

EXAMPLE 5

A biaxially oriented film was produced by the same method as that employed in Example 1 with exception that (C-0) and (B-5) were respectively used in place of the outer layer (C-3) and the core layer (A-5) of Example 1 and layers were laminated in the order of (C-0)/(F)/(B-5)/(F)/(C-0) from the outer layer to the inner layer.

EXAMPLE 6

A biaxially oriented film was produced by the same method as that employed in Example 5 with exception that (B-2) was used in place of the core layer (B-5) of Example 5, layers were laminated in the order of (C-0)/(F)/(B-2)/(F)/(C-0) from the outer layer to the inner layer and the dosage of irradiation was set to 6 megarads by controlling the electron beams.

EXAMPLE 7

A biaxially oriented film was produced by the same method as that employed in Example 1 with exception that (A-3.5) was used in place of the core layer (A-5) of Example 1, layers were laminated in the order of (C-3)/(F)/(A-3.5)/ (F)/(C-0) from the outer layer to the inner layer and the dosage of irradiation was set to 6 megarads by controlling the electron beams.

EXAMPLE 8

A biaxially oriented film was produced by the same method as that employed in Example 7 with exception that (C-4) was used in place of the outer layer (C-3) of Example 7, and layers were laminated in the order of (C-4)/(F)/(A-3.5)/ (F)/(C-0) from the outer layer to the inner layer.

The layer structures of the films produced in Example 1 to 8 and the results obtained from tests of physical properties of the films are shown together in Table 1.

COMPARATIVE EXAMPLE 1

A biaxially oriented film was produced by the same method as that employed in Example 1 with exception that (C-0) and (A-0) were respectively used in place of the outer layer (C-3) and the core layer (A-5) of Example 1, and layers were laminated in the order of (C-0)/(F)/(A-0)/(F)/(C-0) from the outer layer to the inner layer.

COMPARATIVE EXAMPLE 2

A biaxially oriented film was produced by the same method as that employed in Example 3 with exception that (E-0) and (A-0) were respectively used in place of the outer layer (E-3) and the core layer (A-5) of Example 3, and layers were laminated in the order of (E-0)/(F)/(A-0)/(F)/(E-0) from the outer layer to the inner layer.

COMPARATIVE EXAMPLE 3

A biaxially oriented film was produced by the same method as that employed in Example 1 with exception that (C-0) and (A-0) were respectively used in place of the outer layer (C-3) and the core layer (A-5) of Example 1, layers were laminated in the order of (C-0)/(F)/(A-0)/(F)/(C-0) from the outer layer to the inner layer, and the dosage of irradiation was 6 megarads.

COMPARATIVE EXAMPLE 4

A biaxially oriented film was produced by the same method as that employed in Example 1 with exception that (C-0) and (A-0.3) were respectively used in place of the outer layer (C-3) and the core layer (A-5) of Example 1, layers were laminated in the order of (C-0)/(F)/(A-0.3)/(F)/ (C-0) from the outer layer to the inner layer, and the dosage of irradiation was 6 megarads.

COMPARATIVE EXAMPLE 5

A biaxially oriented film was produced by the same method as that employed in Example 1 with exception that (A-3.5) was used in place of the core layer (A-5) of Example 1, layers were laminated in the order of (C-3)/(F)/(A-3.5)/ (F)/(C-0) from the outer layer to the inner layer, and that the melt tubular film obtained by co-extrusion through a die was gradually cooled by a shower ring at 40 to 60° C. to form a flat tubular film having a width of 150 mm and a thickness of 470 μm, and the dosage of irradiation was 6 megarads.

From the thus-obtained flat tubular film, was separated the core layer (PVDC layer). The degree of crystallinity of the core layer which was measured by gradient tube density determination method was 11% by weight.

COMPARATIVE EXAMPLE 6

A PVDC composition (A-3.5), a linear low-density polyethylene composition (C-3), linear low-density polyethtlene (C-0) and an ethylene-ethyl acrylate copolymer (F) were separately extruded through four extruders. The melted polymers obtained were introduced into a co-extrusion ring die in which layers were melt-bonded in the order of (C-3)/(F)/ (A-3.5)/(F)/(C-0) from an outer layer to an inner layer and co-extruded as five layers. The resin temperature of the melt tubular film obtained was 200° C. at the outlet of the die. The tubular film was cooled by a cooling water shower ring at 10 to 20° C. to form a flat tubular film having a width of 150 mm and a thickness of 470 μm. The flat tubular film was then passed through a hot-water bath at 90 to 95° C. and a hot-air cylinder at 110° C. and each 3 times stretched in the longitudinal and lateral directions by an inflation method while cooling by an air ring at 20° C. The width of the biaxially oriented film obtained was about 450 mm and the thickness thereof was about 52 μm.

The core layer (PVDC layer) was separated from the obtained biaxially oriented film and subjected to measurement of a degree of crystallinity using gradient tube density determination. The result of the measurement was 20% by weight.

The biaxially oriented film was irradiated with electron beams at a dosage of 6 megarads in an electron beam irradiating apparatus with a controlled electron beams and at an accelerating voltage of 500 KeV.

COMPARATIVE EXAMPLE 7

A PVDC composition (A-3.5), a linear low-density polyethylene composition (C-3), linear low-density polyethylehe (C-0) and an ethylene-ethyl acrylate copolymer (F) were separately extruded through four extruders. The melted polymers were introduced into a co-extrusion ring die in which they were laminated in the order of (C-3)/(F)/(A-3.5)/(F)/(C-0) from an outer layer to an inner layer and then extruded as five layers. The resin temperature of the melt tubular film obtained was 200° C. at the outlet of the die.

The melt tubular film was expanded by a direct blowing method using the air pressure in the tubular film immediately after it had been extruded from the die so that it was stretched by 3 times in the diameter direction of the cylindrical body while being 3 times drawn in the lengthwise direction under cooling by an air ring at 20° C. The biaxially oriented film obtained had a width of about 450 mm and a thickness of about 52 μm.

The core layer (PVDC layer) was separated from the thus-obtained film and subjected to measurement of a degree of crystallinity using gradient tube density determination method. The result of the measurement was 15% by weight.

Thus-obtained film was irradiated with electron beams at a dosage of 6 megarads in an electron beam irradiating apparatus at an accelerating voltage of 500 KeV.

The layer structures and physical properties of the films obtained in Comparative Examples 1 to 7 are shown together in Table 2.

Table 3 shows the methods of measuring the physical properties. The gel fraction and heat shrinkage percentage at 90° C. of each of the PVDC layers were measured by separating the PVDC layer from each of the biaxially oriented laminated films. The gel fraction of each of the polyolefin layers was measured by separating the polyolefin layer from each of the biaxially oriented laminated films.

TABLE 1

| | Structure of laminated film (thickness) μm | | | | | Dosage of electron beam (Mrad) | Properties of laminated film | | | |
|---|---|---|---|---|---|---|---|---|---|---|
| | | | | | | | Melt hole resistance Number of sheets*1 | | Heat sealing resistance time*2 (min) | Heat shrinkage percentage L/T (%) |
| Example No. | Inner layer | Adhesive layer | Core layer | Adhesive layer | Outer layer | Total thickness | | 5 | 100 | | |
| 1 | C-0 (23) | F (2) | A-5 (8) | F (2) | C-3 (17) | (52) | 2 | 0 | 1 | 10≦ | 30/35 |
| 2 | D-0 (23) | F (2) | A-5 (8) | F (2) | D-3 (17) | (52) | 2 | 0 | 2 | 10≦ | 30/35 |
| 3 | E-0 (23) | F (2) | A-5 (8) | F (2) | E-3 (17) | (52) | 2 | 0 | 1 | 10≦ | 35/42 |
| 4 | C-0 (23) | F (2) | A-2 (8) | F (2) | C-0 (17) | (52) | 6 | 0 | 6 | 10≦ | 30/35 |
| 5 | C-0 (23) | F (2) | B-5 (8) | F (2) | C-0 (17) | (52) | 2 | 0 | 10 | 10≦ | 30/35 |
| 6 | C-0 (23) | F (2) | B-2 (8) | F (2) | C-0 (17) | (52) | 6 | 0 | 8 | 10≦ | 30/35 |
| 7 | C-0 (23) | F (2) | A-3.5 (8) | F (2) | C-3 (17) | (52) | 6 | 0 | 0 | 10≦ | 30/35 |
| 8 | C-0 (23) | F (2) | A-3.5 (8) | F (2) | C-4 (17) | (52) | 6 | 0 | 0 | 10≦ | 30/35 |

| | Properties of laminated film | | | PVDC layer | | | | | Outer layer gel fraction (%) |
|---|---|---|---|---|---|---|---|---|---|
| Example No. | Haze*3 (%) | Oxygen gas permeability (cc/m² day atom) | Degree of coloring of laminated film | Crosslinking agent | | Gel fraction (%) | Heat shrinkage percentage L/T (%) | Degree of crystallinity before irradiation (%) | |
| | | | | Type | Adding amount (PHR) | | | | |
| 1 | 10 | 90 | ⊙ | TMP-TMA | 5 | 40 | 35/37 | 3 | 23 |
| 2 | 10 | 90 | ⊙ | TMP-TMA | 5 | 40 | 35/37 | 3 | 20 |
| 3 | 14 | 90 | ⊙ | TMP-TMA | 5 | 40 | 35/37 | 3 | 25 |
| 4 | 8 | 78 | ⊙ | TMP-TMA | 2 | 45 | 40/42 | 4 | 0 |
| 5 | 12 | 92 | ⊙ | TMP-POTMA | 5 | 35 | 30/33 | 4 | 0 |
| 6 | 10 | 80 | ⊙ | TMP-POTMA | 2 | 40 | 35/37 | 4 | 0 |
| 7 | 8 | 75 | ⊙ | TMP-TMA | 3.5 | 50 | 45/50 | 3 | 35 |
| 8 | 8 | 75 | ⊙ | TMP-TMA | 3.5 | 50 | 45/50 | 3 | 48 |

*1 The allowable limits in the cases of the numbers of sheets of 5 and 100 are 0 and 15, respectively.
*2 A time until breakage of 10 minutes or more is practicable.
*3 A degree of haze of 20% or more is undesirable for practical use.

TABLE 2

| | Structure of laminated film (thickness) μm | | | | | | Dosage of electron beam (Mrad) | Properties of laminated film | | | |
|---|---|---|---|---|---|---|---|---|---|---|---|
| | | | | | | | | Melt hole resistance Number of sheets*1 | | Heat sealing resistance time*2 (min) | Heat shrinkage percentage L/T (%) |
| Comparative Example No. | Inner layer | Adhesive layer | Core layer | Adhesive layer | Outer layer | Total thickness | | | 5 | 100 | | |
| 1 | C-0 (23) | F (2) | A-0 (8) | F (2) | C-0 (17) | (52) | | 2 | 2 | 37 | 5 | 23/27 |
| 2 | E-0 (23) | F (2) | A-0 (8) | F (2) | E-0 (17) | (52) | | 2 | 4 | 84 | 3/4 | 26/33 |
| 3 | C-0 (23) | F (2) | A-0 (8) | F (2) | C-0 (17) | (52) | | 6 | 1 | 21 | 7 | 30/35 |

TABLE 2-continued

| | | | | | | | | | | | |
|---|---|---|---|---|---|---|---|---|---|---|---|
| 4 | C-0 (23) | F (2) | A-0.3 (8) | F (2) | C-0 (17) | (52) | 6 | 1 | 18 | 8 | 30/35 |
| 5 | C-0 (23) | F (2) | A-3.5 (8) | F (2) | C-3 (17) | (52) | 6 | 0 | 2 | 10≦ | 30/35 |
| 6 | C-0 (23) | F (2) | A-3.5 (8) | F (2) | C-3 (17) | (52) | 6 | 0 | 2 | 10≦ | 30/35 |
| 7 | C-0 (23) | F (2) | A-3.5 (8) | F (2) | C-3 (17) | (52) | 6 | 0 | 2 | 10≦ | 3/5 |

| | Properties of laminated film | | | PVDC layer | | | | |
|---|---|---|---|---|---|---|---|---|
| Comparative Example No. | Haze*3 (%) | Oxygen gas permeability (cc/m² day atom) | Degree of coloring of laminated film | Crosslinking agent Type | Adding amount (PHR) | Gel fraction (%) | Heat shrinkage percentage L/T (%) | Degree of crystallinity before irradiation (%) | Outer layer gel fraction (%) |
| 1 | 30 | 65 | ⊚ | | 0 | 0 | 2/2 | 4 | 0 |
| 2 | 60 | 65 | ⊚ | | 0 | 0 | 2/2 | 4 | 0 |
| 3 | 26 | 65 | ○ | | 0 | 0 | 2/2 | 4 | 0 |
| 4 | 20 | 67 | ○ | TMP-TMA | 0.3 | 4 | 2/2 | 3 | 0 |
| 5 | 14 | 78 | X | TMP-TMA | 3.5 | 40 | 42/45 | 11 | 35 |
| 6 | 18 | 78 | X | TMP-TMA | 3.5 | 40 | 33/37 | 20 | 35 |
| 7 | 17 | 80 | X | TMP-TMA | 3.5 | 40 | 2/2 | 15 | 35 |

TABLE 3

| Measurement item | Measurement method |
|---|---|
| Gel fraction | (1) Gel fraction of PVDC Assuming $W_1$ to be the weight of a sample and $W_2$ to be the weight of an insoluble substance which remains after the immersion in a tetrahydrofuran (THF) solvent kept at 45° C. for 2 hours, then dried under vacuum for 24 hours, the gel fraction is calculated by the following equation; $$\text{Gel fraction} = \frac{W_2}{W_1} \times 100$$ (2) Gel fraction of polyolefin The same measurement as that for calculating of the gel fraction of PVDC is performed with the exception that the THF solvent kept at 45° C. is replaced by a trichlorobenzene solvent kept at 135° C. |
| Heat shrinkage percentage | 20 films of 10 cm × 10 cm cut from a sample are shrunk in a relaxed state for 10 seconds in a hot-water bath at 90° C. The ratios of length and width to initial length and width are determined as the shrinkage percentage, and the values obtained are averaged. |
| Heat sealing resistance | A film is spread over an embroidery frame in a stretched state in such a manner that no tensile deformation takes place and a seal line is placed at the center of the frame. The seal line is immersed in hot water at 90° C. after lard has been applied thereto, and then the time taken until the seal line is broken is measured with 10 minutes in a limit |
| Melt hole resistance | A hole having an internal diameter of 20 mm and a depth of 20 mm is covered with a film which is pressed by a seal packing. After the hole has been evacuated to 10 Torr, the hole is immersed in hot water at 90° C. for 10 seconds. The number of holes produced when 5 and 100 sheets, respectively, of film are respectively subjected to this treatment is determined. |
| Haze (%) | A 10 cm × 10 cm portion cut from a laminated film is shrunk in a relaxed state for 1 minute in a hot-water bath at 90° C. and measured to determine the degree of haze (%) using a Model NDH-Σ80 of haze meter produced by Nihon Denshoku Kogyo K.K. |
| Degree of coloring of laminated film | A 10 cm × 10 cm portion cut from a laminated film is shrunk in a relaxed state for 1 minute in a boiling water bath and then measured to determine the degree of coloring using the following three criteria: ⊚: No coloring is visually observed. ○: Slight coloring is observed but no problem in practical use is present. X: Extensive coloring is observed which makes it impossible to put the film into practical use |
| Degree of crystallinity of PVDC | The density d (g/cm³) of a sample is measured by gradient tube density determination using as a gravity solution an aqueous zinc chloride solution at 23° C. in accordance with JIS K7112. Density of crystal phase of PVDC: dc = 1.95 (g/cm³) (from Polymer Handbook) The density da of an amorphous phase of PVDC is measured by using as a gravity solution an aqueous zinc chloride solution at 5° C. so that the sample does not crystallize while cooling it with the liquid nitrogen after melting of it for at least 2 minutes at 180° C. The degree of crystallinity is calculated by the following equation: $$\frac{d - da}{dc - da} \times 100$$ |
| Oxygen gas permeability | A film is allowed to stand in an atmosphere of 30° C. and 100% RH for 1 week before measurement. The oxygen gas permeability is measured in an atmosphere of 30° C. and 100% RH by using MOCON#OX-TRAN TWIN (coulometric detection method) which is the apparatus specified by ASTM: D 3985-81. |

As seen from the examples of the present invention, since the PVDC in the core layer of the biaxially oriented laminated film of the present invention exhibits heat shrinkage, the biaxially oriented laminated film exhibits improved transparency after it has been wrapped around an article and subjected to hot-water boiling. The film also exhibits excellent heat sealing resistance and melt hole resistance and is a well-balanced film suitable for packaging foods. The film having an outer layer containing a crosslinked polyolefin exhibits particularly excellent melt hole resistance.

Neither of the films of Comparative Examples 1 and 2 contains any crosslinking agent in the polyolefin present in the outer layer and in the PVDC in the core layer and they thus exhibit significantly inferior melt hole resistance, heat sealing resistance and haze properties.

The films of Comparative Examples 3 and 4 contains no crosslinking agent or only a small amount of crosslinking agent in the PVDC layer and they thus exhibit poorer quality of melt hole resistance and heat sealing resistance than the film of Example 4 even when the dosage rate used was as large as 6 megarads. All of the films of Comparative Examples 5 to 7 exhibit a degree of crystallinity above 5% before irradiation and a great degree of coloring and thus cannot be put into practical use.

What is claimed is:

1. A biaxially oriented heat-shrinkable laminated film exhibiting a heat shrinkage percentage of 15% or more at 90° C. and excellent gas barrier properties, and having a layer of vinylidene chloride copolymer composition containing 0.5 to 9.1% by weight of a polyfunctional acrylate or methacrylate, said vinylidene chloride copolymer being crosslinked by applying electron beams to said laminate at a dosage of 1 to 10 megarads.

2. A heat-shrinkable laminated film according to claim 1, wherein one layer of said laminate is a layer of polyolefin composition containing 0.5 to 7.5% by weight of at least one crosslinking agent selected from the group consisting of $\alpha, \omega$-alkyl diacrylates, $\alpha, \omega$-alkyldimethacrylate, aromatic urethane acrylates and aromatic urethane methacrylate, said polyolefin being crosslinked by applying electron beams to said laminate at a dosage of 1 to 10 megarads.

3. A heat-shrinkable laminated film according to claim 1 comprising a laminate having outer and inner layers composed of a polyolefin, an intermediate layer composed of a vinylidene chloride copolymer composition containing 0.5 to 9.1% by weight of a polyfunctional acrylate or methacrylate, and adhesive layers each composed of an adhesive polymer and respectively disposed between said layers, said vinylidene chloride copolymer being crosslinked by applying electron beams to said laminate at a dosage of 1 to 10 megarads.

4. A heat-shrinkable laminated film according to claim 3, wherein said outer layer is composed of a polyolefin polymer composition containing 0.5 to 7.5% by weight of at least one crosslinking agent selected from the group consisting of $\alpha, \omega$-alkyl dimethacrylates, $\alpha, \omega$-alkyldiacrylates, aromatic urethane methacrylates, and aromatic urethane acrylates, said polyolefin being crosslinked by applying electron beams to said laminate at a dosage of 1 to 10 megarads.

5. A heat-shrinkable laminated film according to claim 1, wherein the degree of crystallinity of said vinylidene chloride copolymer is 5% by weight or less before irradiation with electron beams.

6. A heat-shrinkable laminated film according to claim 1, wherein the gel fraction of said crosslinked vinylidene chloride copolymer is 20 to 80%.

7. A heat-shrinkable laminated film according to claim 2 or 4, wherein the gel fraction of said crosslinked polyolefin is 20 to 80%.

8. A heat-shrinkable laminated film according to claim 2 or 4, wherein said polyolefin is at least one selected from the group consisting of low-density polyethylene, ethylene-vinyl acetate copolymers, ethylene-ethyl acrylate copolymers, ethylene-propylene copolymers containing 2 to 7% by weight of ethylene, ethylene-acrylic acid copolymers containing 5 to 20% by weight of acrylic acid, linear low-density polyethylene and very low-density polyethylene.

9. A heat-shrinkable laminated film according to claim 1, wherein said polyfunctional methacrylate or acrylate is a compound represented by the following formula (1):

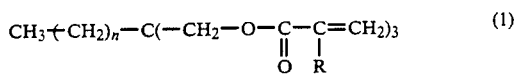

(wherein R denotes hydrogen or methyl group and n denotes an integer of 0 to 4) or the following formula (2):

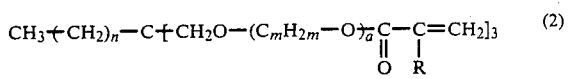

(wherein R denotes hydrogen or methyl group, n denotes an integer of 0 to 4, m denotes an integer of 1 to 3 and a denotes an integer of 1 to 3).

10. A heat-shrinkable laminated film according to claim 2 or 4, wherein said $\alpha, \omega$-alkyl dimethacrylates or $\alpha, \omega$-alkyl diacrylates are compounds represented by the following formula (I):

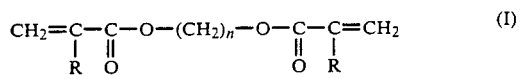

(wherein R denotes hydrogen or methyl group and n denotes an integer of 10 to 36).

11. A heat-shrinkable laminated film according to claim 2 or 4, wherein said aromatic urethane methacrylates or aromatic urethane acrylates are compounds represented by the following formula (II) or (III):

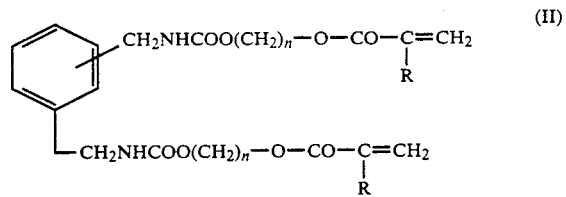

(wherein R denotes hydrogen or methyl group, n denotes an integer of 1 to 6 and the urethane methacrylates or urethane acrylates combine with the aromatic ring at the metha- or para-position)

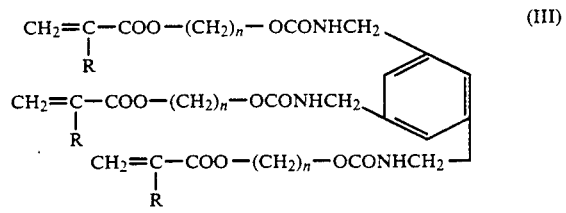

(wherein R denotes hydrogen or methyl group and n denotes an integer of 1 to 6).

12. A biaxially oriented heat shrinkable laminated film according to claim 1, wherein the electron beam is applied to said laminate before biaxial orientation.

* * * * *